Patented Jan. 18, 1944

2,339,302

UNITED STATES PATENT OFFICE 2,339,302

CATALYTIC TREATMENT OF HYDROCARBONS

Charles L. Thomas and Joseph D. Danforth, Chicago, Ill., assignors to Universal Oil Products Company, Chicago, Ill., a corporation of Delaware No Drawing. Application November 12, 1940, Serial No. 365,258

8 Claims. (Cl. 196—52)

This invention relates to a process for the conversion of hydrocarbons, such as petroleum fractions and hydrocarbon oils generally, in the presence of catalysts to produce substantial yields of hydrocarbons within the gasoline boiling range and having high antiknock value. The process may be applied to conversion involving low boiling as well as high boiling hydrocarbons whether they are of synthetic or natural origin, or are produced as for example from primary distillate resulting from the destructive distillation of hydrocarbon-containing materials such as coals, lignites and shales.

It has been found in connection with synthetic cracking catalysts consisting of hydrated silica activated by various hydrous oxides such as hydrated alumina, hydrated zirconia, thoria, etc., that approximately 10-60% of inert or mildly active refractory materials such as clays, for example, may be introduced into the catalytic material to reduce the cost while only reducing the activity of the catalyst to a small extent. According to the practice of the present invention a catalyst of this type is used which has added thereto a component which offsets this loss of activity and in some cases gives increased activity over the original catalyst. In addition to this, the use of the preferred catalyst brings about a reduction of the gas and carbon forming reactions which proceed concurrently or incidentally to the gasoline-forming reactions.

In one specific embodiment the present invention comprises subjecting hydrocarbon oil under conditions of temperature, pressure and time adequate to produce a substantial yield of high antiknock gasoline to contact with granular particles of a synthetically prepared composite of hydrated silica and hydrated alumina associated with a refractory support, said particles having boric oxide impregnated thereon.

According to the invention, hydrocarbon oils more generally of a distillate character are catalytically cracked in the presence of particles of synthetic cracking catalysts intimately mixed with refractory supports which are then further activated by boric oxide deposited in and on the active surfaces. The hydrous oxide catalysts deposited upon the refractory supports consist preferably of a mixture of hydrated silicon dioxide and hydrated alumina and/or zirconia prepared by special methods so as to eliminate alkali metal impurities. Thoria, magnesia, vanadia and other oxides may also be similarly added but not with equivalent results. In the pending application of one of the inventors, United States Serial No. 312,845, filed January 8, 1940, the mixing of boric oxide has been disclosed with this type of cracking catalyst which, however, has not been mixed with a refractory support and has been impregnated in a different manner. In the present invention, improved results have been obtained because the boric oxide is deposited by new methods upon the supported silica-alumina catalyst and as a result thereof, the catalyst can be prepared at a lower cost, it has a longer life, and higher temperatures and shorter time can be used when regenerating the catalyst. The refractory supports which may be employed are relatively numerous and there are a number of methods which may be employed in preparing the mixtures of hydrous oxides upon which a boron compound is subsequently deposited to yield boric oxide.

The refractory supporting materials employed include powdered diatomaceous earth, kaolin, China clay, pumice, sand, carborundum, quartz, fine powders of alumina, zirconia, thoria, titania, chromite, rutile, ilmenite, zircon, bauxite, etc. Many of these materials may have catalytic properties in various chemical reactions and some of them influence hydrocarbon cracking reactions. It is of particular importance to note, however, that all of these materials have no activity or relatively small activity as compared with the specially prepared catalysts useful in this invention. The supports are of value only in so far as they are refractory materials which will not fuse or sinter when exposed to high temperature conditions in periodic use and regeneration. When one of these materials having the greatest amount of activity and another having no activity in influencing hydrocarbon reactions are used as supports under corresponding conditions, no substantial difference is reflected in the activity of the supported catalytic materials. The amount of the support used may be up to 50% or more by weight of the completed catalytic material. The smaller the particle size of the support, the more suitable it may be considered because of the more extended distribution throughout the catalyst. Although the powdered support may be added to the catalyst gel during some stage of its preparation as for example when the silica gel is precipitated, it may be preferable to intimately mix the finely divided support with the washed or purified catalyst gel, thus reducing the amount of material to be handled and washed in the preparation of the gel. Alternatively, but not with equivalent results, the dried catalyst gel may be mixed with the powdered support or it may for example be mixed with a paste of the supporting material and then extruded to form particles of supported catalyst for impregnation as is later described.

The components of the synthetic composite which are intimately associated with the refractory support may be separately, concurrently, or consecutively precipitated. According to one general method of preparation, the hydrated silica may be separately, concurrently, or consecutively precipitated. According to one general method of preparation, the hydrated silica may be precipitated from a dilute solution of commercial water glass, and subsequently mixed with the remaining hydrous oxide components. The mixing may be accomplished for example, by suspending the hydrated silica precipitated upon the refractory support in a solution of a metal salt and then precipitating the hydrous oxide of the corresponding metal in the presence of the suspended hydrated supported silica by the addition of a suitable alkaline precipitant. Various other procedures may be followed wherein these components may be co-precipitated in the presence of the refractory support or separately precipitated and the components intimately mixed. The supported hydrated silica may for example, be heated in a solution of a metal salt, and the corresponding metal hydrous oxide deposited in the presence of the supported hydrated silica by hydrolysis, or the said silica may be mixed with a relatively concentrated solution of a metal salt to form a paste which is then heated to deposit the desired metal oxide.

In the manufacture of refractory synthetic catalysts it has been found necessary where sodium compounds have been included in the catalytic material during preparation, to treat the material at some stage of its preparation in order to remove these alkali metal impurities. This may be accomplished by washing with various acidic or salt solutions such as solutions of ammonium salts of strong acids, or of salts of the metals of the hydrous oxides used. This is illustrated in the specific examples given below.

The composite gel which is usually recovered as a filter cake may be extruded or may be dried and then admixed with a lubricant to facilitate adhesion of the particles and prevent adhering or sticking in the briquetting or pilling machines used in forming the material into pellets, pills or other consolidated and shaped particles. Various other methods are also available for making granular particles such as drying a uniform slurry in thin layers so as to shrink and crack into granules of graduated mesh. The particles may then be calcined at temperatures of the order of 1000–1600° F., more or less. Whatsoever the method of compositing the hydrous oxides constituting the preferred cracking catalysts, and mixing them with the refractory support, and whatsoever the subsequent procedures used to consolidate or form into granular particles, these particles may be improved in their catalytic properties according to the following procedures although not necessarily with exactly equivalent results.

Calcined supported synthetic cracking catalysts are impregnated with a solution of a suitable boron compound or a suitable liquid boron compound. Compounds which may be used are boric acid and organic borates, for example, or other boron compounds which will form boric oxide upon decomposition. The dried silica-alumina and/or zirconia catalyst may be dipped, immersed, sprayed or otherwise treated to absorb the boron compound while in a liquid condition. The impregnated catalyst may then be ignited for example, or it may be heated to drive off and recover the solvent while the impregnated boron compound is decomposed to produce boric oxide. Thus, a solution of boric acid in methyl alcohol or tri-amyl borate may be absorbed upon a synthetically prepared cracking catalyst which is subsequently heated or ignited to remove the liquid and deposit boric oxide in and on the surfaces of the cracking catalyst. A large number of organic compounds may be used such as dibutyl borate, triethyl boron, boron trimethyl, fluo-boric acid, etc., either as liquids or in organic solvents. Similarly, boric acid may be used and any suitable solvent may be employed. Alcoholic solutions are particularly desirable but the practice is not restricted thereto since glycerine has been employed with good results. Other polyhydroxy alcohols such as ethylene glycol may also be used as well as triethanol amine. The concentration of boric oxide on the catalyst surfaces may be controlled by varying the concentration and amount of the solutions of the boron compound used, or the number of impregnating treatments. In the formation of the boric oxide on the catalyst surfaces, the impregnated boron compound may be decomposed in any desired manner. In the case of triamyl borate the catalyst may be ignited or it may be hydrolyzed in a current of moist air for example, the ignition procedure being preferable. Catalysts prepared in this manner containing approximately 2 to 8% of boric oxide by weight of the catalyst generally give good results but higher proportions of the boric oxide up to 15% or more may be employed.

Various types of hydrocarbon conversion reactions take place in the presence of the catalyst depending partly upon the temperature, pressure and time conditions and partly upon the nature of the hydrocarbon oil processed. These reactions may include carbon-to-carbon cleavage, isomerization, cyclization, dehydrogenation, hydrogenation and desulfurization reactions. In the case of higher boiling hydrocarbons, for example, there is a cleavage of long-chained carbon-to-carbon bonds. Isomerization reactions may occur whereby the lower boiling hydrocarbons formed tend to become more branch chained. Also hydroaromatic hydrocarbons present in the oil undergoing decomposition or formed therein by cyclization of olefins may undergo dehydrogenation to form aromatic hydrocarbons and hydrogen liberated in these reactions may combine with other olefins present during reaction to form paraffinic hydrocarbons. The later reactions tend to occur at the lower temperatures given in the range of operating conditions whereas more unsaturated hydrocarbons, particularly olefins are produced at the higher temperatures employed. The hydrocarbons produced are generally of a more branched chain structure than are those produced in thermal cracking treatment. The temperature employed may be a temperature from about 750° F. to about 1100° F. and the pressure employed may be from about atmospheric to about 500 pounds per square inch. The space velocities employed may vary from ¼ to 60, the space velocity being defined as the hourly volume of liquid hydrocarbon charged per volume of reactor space occupied by the catalyst.

The catalysts may be conveniently utilized in carrying out various types of hydrocarbon conversion reactions when employed as filling material in tubes or they may be disposed in trays or in chambers. The average size of the particles may vary within the approximate range of 4 to 10 mesh more or less which is not restricted to any particular shape or method of particle formation. A hydrocarbon oil fraction may be heated to substantially reaction temperature and the vapors contacted with the stationary catalyst masses. The hydrocarbon vapors may be passed downward through the catalyst, and where large beds of catalyst are involved the passage of vapors may be restricted to definite paths rather than allowing the vapors to have unrestricted contact with the large beds of catalytic material. Where this method is used, the temperature of the contact materials while in use and during regeneration may be controlled by various operating procedures or by heat interchange devices. After the oil vapors are passed over the catalyst as in catalytic cracking for example, the products may be separated into high boiling fractions which are not to be further cracked and/or insufficiently converted fractions which may be subjected to further cracking treatment and the gasoline and gaseous products. The higher boiling fractions may be removed from the system, may be returned directly to admixture with the charging stock for processing or may be processed in separate passes so as to ultimately obtain maximum utilization of the charging stock in producing the gasoline product. The process however, is not restricted to the use of the catalyst as granular masses disposed as fixed beds in catalytic reactors, since the catalytic material may be impregnated when in the dried powder condition and the impregnated powdered material subsequently mixed with a stream of hydrocarbon oil to be processed and then subjected to conditions of time, temperature and pressure adequate to produce substantial yields of high antiknock gasoline.

The following specific examples are given to illustrate specific applications of the process of the invention, the method of catalyst preparation also being indicated. The invention should not be considered as limited to these examples of the process or to the particular catalyst preparation since these are given merely as illustrations of the novelty and utility of the invention.

Example I

A catalyst having the approximate composition of $100SiO_2:5Al_2O_3:5B_2O_3$ and containing 50% by weight of kaolin is prepared as follows: A commercial sample of water glass of approximately 41° Baumé gravity and containing approximately 28.5% $SiO_2$ and 8.9% $Na_2O$ is diluted approximately 10 times with water containing in suspension finely divided kaolin passing a 300 mesh screen. Hydrochloric acid is added to the water glass solution while agitating thoroughly and a precipitate begins to form and remains in suspension in the alkaline solution. The addition of acid is continued until there is an excess of acid, the pH being approximately 3. The excess acid may then be substantially neutralized by the addition of ammonium hydroxide whereupon the hydrated silica is practically all precipitated. The hydrated silica is filtered and washed with water acidulated with hydrochloric acid until the precipitate is substantially free from sodium. The purified hydrated silica is suspended in an aluminum chloride solution in an amount suitable to form catalyst of the above composition, and hydrated alumina precipitated in the presence of the suspended hydrated silica by the addition of ammonium hydroxide. The composite precipitate is filtered and the filter cake is washed with water and dried at approximately 200-250° F. The dried material is then mixed with a small amount of hydrogenated vegetable oil lubricant and formed into pelleted particles of ⅛" x ⅛" size in a pilling machine. The material is then calcined at a temperature of approximately 1500° F. for one hour. After cooling, the calcined material is impregnated with an alcoholic solution of boric acid in sufficient amount to deposit approximately 5 mols of $B_2O_3$ per 100 mols of $SiO_2$ on the catalyst. The boric oxide is deposited by heating to distill out and recover the methyl alcohol thereupon depositing the boric oxide in and on the surfaces of the supported silica-alumina catalyst.

Catalyst as above described is disposed in a reactor heated to a temperature of approximately 932° F. and a Pennsylvania gas oil is vaporized and preheated to approximately the same temperature and directed through the catalyst at substantially atmospheric pressure. The volume per cent yield of gasoline is 30.2% as compared to 27.7 volume per cent of gasoline which is obtained when processing under the same conditions and using the same catalyst with the omission of the boric oxide according to the present invention. The antiknock value of the gasoline produced is approximately 80 by the motor method.

Example II

A catalyst having approximately the same composition as the catalyst of Example I is similarly prepared except that ½ of the weight of water glass used, of sodium chloride is added to the water glass solution containing finely divided kaolin before the addition of hydrochloric acid. As a result of the addition of the sodium chloride a very finely divided precipitate is deposited upon the finely divided kaolin as contrasted with the gelatinous precipitate that is formed in Example I. The catalyst is then purified to remove alkali metal impurities similarly as in Example I and the hydrated alumina deposit upon the purified finely divided hydrated silica. The finely divided material is dried and impregnated with the boric oxide without forming into granular particles.

Catalyst prepared in the above manner is mixed to the extent of 1% by weight with a Pennsylvania gas oil of approximately a 36° A. P. I. gravity and heated to a temperature of approximately 975° F. and directed to a reaction chamber at an average temperature of approximately 815° F. at a pressure of approximately 50 pounds per square inch. A yield of approximately 28 volume per cent of 400° F. end point gasoline having 76 octane number is obtained in a single pass. The spent catalyst is separated from non-vaporous residue removed from the process. It is then filtered to remove most of the non-vaporous oil residue and ignited at a temperature of approximately 1200° F. in the presence of air. Catalysts regenerated in this manner give substantially the same gasoline yield as above.

Example III

A catalyst having the approximate composition of $100SiO_2:20ZrO_2:5B_2O_3$ and containing 50% by weight of kaolin is prepared as follows: This catalyst is prepared similarly as the catalyst in Example I except that the finely divided kaolin is not mixed in the water glass solution but is added to the gel composite before drying. The hydrated silica is precipitated and washed substantially free from sodium and then suspended in a zirconyl chloride solution in an amount suitable to form catalyst of the above composition. Hydrated zirconia is then precipitated in the presence of the suspended hydrated silica by the addition of ammonium hydroxide. The composite precipitate is filtered and the filter cake is water washed and intimately mixed with the finely divided kaolin. The mixture is then extruded through a quarter-inch die and the extruded material cut into quarter-inch sections. The extruded particles are dried at approximately 200–250° F. and the dried material is calcined at a temperature of approximately 1500° F. for one hour. After cooling, the calcined material is impregnated with an alcoholic solution of boric acid in sufficient amount to deposit approximately 5 mols $B_2O_3$ per hundred mols of $SiO_2$ on the catalyst particles. The boric oxide is deposited by heating to distill out and recover the methyl alcohol, thereupon depositing the boric oxide in and on the surfaces of the supported silica-alumina catalyst.

Catalysts as described above when disposed in a reactor and contacted with vapors of a Mid-Continent gas-oil at a temperature of approximately 900° F. using a space velocity of approximately 4 and a pressure of approximately 40 pounds per square inch give a yield of approximately 35 volume per cent of 400 end-point gasoline having an octane number of approximately 78 by the motor method.

We claim as our invention:

1. A process for the conversion of hydrocarbons to produce a substantial yield of high antiknock gasoline therefrom which comprises subjecting said hydrocarbons at a temperature of from about 750 to about 1100° F. at a pressure of from about atmospheric to about 500 pounds per square inch and a space velocity of from about ¼ to about 60 to contact with a calcined supported silica-zirconia catalyst said composite having been impregnated with boric oxide subsequent to the calcination thereof.

2. A process for the conversion of hydrocarbons to produce a substantial yield of high antiknock gasoline therefrom which comprises subjecting said hydrocarbons at a temperature of from about 750 to about 1100° F. at a pressure of from about atmospheric to about 500 pounds per square inch and a space velocity of from about ¼ to about 60 to contact with a cracking catalyst resulting from compositing precipitated hydrated silica, precipitated hydrated zirconia and a finely divided refractory support, drying, calcining and impregnating said calcined material with boric oxide.

3. A catalyst for use in hydrocarbon conversion reactions resulting from the calcination of a composite comprising a hydrated silica, a hydrated zirconia and a relatively inactive support, said composite having been impregnated with boric acid subsequent to the calcination thereof.

4. The catalyst defined in claim 3 further characterized in that it contains hydrated alumina.

5. A process for the conversion of hydrocarbons which comprises contacting the hydrocarbons under catalytic cracking conditions with a calcined composite comprising a hydrated silica and a hydrated zirconia, said composite having been impregnated with boric oxide subsequent to the calcination thereof.

6. The process of claim 5 further characterized in that the catalyst contains alumina.

7. A process for the conversion of hydrocarbons which comprises contacting the hydrocarbon under catalytic cracking conditions with a calcined composite comprising silica, zirconia and a refractory supporting material of relatively low catalytic activity, said composite having been impregnated with boric oxide subsequent to the calcination thereof.

8. A process for the conversion of hydrocarbons which comprises contacting the hydrocarbon under catalytic cracking conditions with a calcined composite comprising silica, zirconia, alumina and a refractory supporting material of relatively low catalytic activity, said composite having been impregnated with boric oxide subsequent to the calcination thereof.

CHARLES L. THOMAS.
JOSEPH D. DANFORTH.